(12) United States Patent
Schröder (10) Patent No.: US 6,964,102 B2
(45) Date of Patent: Nov. 15, 2005

(54) DEVICE AND METHOD FOR DETECTING THE ROTATIONAL MOVEMENT OF AN ELEMENT ROTATABLY MOUNTED ABOUT AN AXIS

(75) Inventor: Wilhelm Schröder, Eislingen (DE)

(73) Assignee: Dr. Johannes Heidenhain GmbH, Traunrueti (DE)

( * ) Notice: Subject to any disclaimer, the term of this patent is extended or adjusted under 35 U.S.C. 154(b) by 236 days.

(21) Appl. No.: 10/381,076

(22) PCT Filed: May 31, 2001

(86) PCT No.: PCT/DE01/02107

§ 371 (c)(1),
(2), (4) Date: Aug. 15, 2003

(87) PCT Pub. No.: WO02/25220

PCT Pub. Date: Mar. 28, 2002

(65) Prior Publication Data

US 2004/0025357 A1 Feb. 12, 2004

(51) Int. Cl.$^7$ .............................................. G01B 21/22
(52) U.S. Cl. ............................ 33/1 PT; 33/502; 33/706
(58) Field of Search ................................ 33/1 PT, 1 N, 33/706–708, 502

(56) References Cited

U.S. PATENT DOCUMENTS

| | | | | |
|---|---|---|---|---|
| 4,190,961 A | * | 3/1980 | James et al. ................... 33/502 |
| 4,819,339 A | | 4/1989 | Kunzmann et al. | |
| 4,893,071 A | | 1/1990 | Miller | |
| 5,537,210 A | | 7/1996 | Kaneda et al. | |
| 5,657,544 A | * | 8/1997 | Ota et al. ...................... 33/1 N |
| 6,457,245 B1 | * | 10/2002 | Hoskins ....................... 33/1 PT |
| 6,543,149 B1 | * | 4/2003 | Carlisle ........................ 33/706 |
| 2002/0020070 A1 | * | 2/2002 | Takeuchi ..................... 33/1 PT |
| 2004/0107586 A1 | * | 6/2004 | Nakamura et al. .......... 33/1 PT |
| 2004/0123684 A1 | * | 7/2004 | Tsai ............................. 33/706 |

FOREIGN PATENT DOCUMENTS

| | | |
|---|---|---|
| DE | 36 37 410 A1 | 5/1988 |
| DE | 40 09 577 A1 | 8/1991 |
| DE | 41 06 168 A1 | 8/1991 |
| DE | 42 12 990 A1 | 10/1993 |
| EP | 0 344 942 A2 | 12/1989 |
| EP | 0 628 791 A2 | 12/1994 |

OTHER PUBLICATIONS

"Werkzeugmaschinen und Fertigungssysteme," published by VDI Publishers, vol. 4, 1996, pp. 148–153.

* cited by examiner

*Primary Examiner*—G. Bradley Bennett
(74) *Attorney, Agent, or Firm*—Brinks Hofer Gilson & Lione

(57) ABSTRACT

A device for detecting the rotational movement of an element which is rotatably seated around an axis, the device including a material measure that rotates about an axis of rotation. A first measuring graduation provided on the material measure and which scans along a first direction, which has a component along the axis of rotation and a second measuring graduation provided on the material measure, wherein both the first measuring graduation and the second measuring graduation surround the axis of rotation in a ring shape, and which can be scanned along the first direction and a second direction that is linearly independent of the first direction. At least three measuring heads, which are spaced apart from each other along a circumferential direction which surrounds the axis of rotation, are assigned to each of the first measuring graduation and the second measuring graduation for scanning the first measuring graduation and the second measuring graduations.

35 Claims, 7 Drawing Sheets

DEVICE AND METHOD FOR DETECTING THE ROTATIONAL MOVEMENT OF AN ELEMENT ROTATABLY MOUNTED ABOUT AN AXIS

Applicant claims, under 35 U.S.C. § 120 and 365, the benefit of priority of the filing date of May 31, 2001 of a Patent Cooperation Treaty patent application, copy attached, Ser. No. PCT/DE01/02107, filed on the aforementioned date, the entire contents of which are incorporated herein by reference, wherein Patent Cooperation Treaty patent application Ser. No. PCT/DE01/02107 was not published under PCT Article 21(2) in English.

Applicant claims, under 35 U.S.C. § 119, the benefit of priority of the filing date of Sep. 18, 2000 of a German patent application, copy attached, Ser. No. 100 47 776.3, filed on the aforementioned date, the entire contents of which are incorporated herein by reference.

BACKGROUND OF THE INVENTION

1. Field of the Invention

The present invention relates to a device and a method for detecting the rotational movement of an element which is rotatably seated around an axis, in particular a turntable.

2. Discussion of Related Art

The detection of the rotational movement takes place for the purpose of determining deviations from an ideal rotational movement around a predetermined axis. For example, this can be a so-called calibrating measurement, wherein the detected deviations of a rotational movement from an ideal rotational movement can be used for a subsequent calibration. This means that the knowledge of the deviations from an ideal rotation which have occurred can be taken into consideration by calculation in the course of a subsequent use of the rotationally seated element, for example a turntable or a machine tool spindle.

The deviations of the rotational movement of a turntable or other rotationally seated element from an ideal rotational movement around a predetermined axis can be separated into six individual deviations, namely respectively three translatory and rotary deviations.

A method and a device for measuring turntable deviations are known from DE 36 37 410 C2, wherein the turntable is arranged within the measuring volume of a coordinate measuring device, and the deviations are detected with the aid of the coordinate measuring device in that a test member is fastened on the turntable, which has a multitude of measuring points formed by contact faces, and that respective sets of measuring point coordinates are measured by the coordinate measuring device by means of contact in various angular positions of the turntable. The turntable deviations are calculated by means of these sets of measuring points. This method has the disadvantage that contact with the test member is required and that the individual deviations can only be determined in a sequence of several measurements.

A method for measuring the deviation of rotating axes by means of test spheres or test cylinders is described in the reference "Werkzeugmaschinen und Fertigungssysteme" [Machine Tools and Production Systems], vol. 4, VDI publishers, 1996, p. 149 et seq. The methods mentioned there have the disadvantage, however, that each only permits the measuring of a portion of the six individual deviations.

SUMMARY AND OBJECTS OF THE INVENTION

An object of the present invention is based on providing a device and a method for detecting the rotational movement of an element which is rotatably seated around an axis, which make possible the complete determination of the occurring individual deviations, or a compensation of the individual deviations during a measurement.

In accordance with the present invention, this object is attained by creating a device for detecting the rotational movement of an element which is rotatably seated around an axis, the device including a material measure that rotates about an axis of rotation. A first measuring graduation provided on the material measure and which scans along a first direction, which has a component along the axis of rotation and a second measuring graduation provided on the material measure, wherein both the first measuring graduation and the second measuring graduation surround the axis of rotation in a ring shape, and which can be scanned along the first direction and a second direction that is linearly independent of the first direction. At least three measuring heads, which are spaced apart from each other along a circumferential direction which surrounds the axis of rotation, are assigned to each of the first measuring graduation and the second measuring graduation for scanning the first measuring graduation and the second measuring graduations.

This object is also attained by a method for detecting rotational movement of an element which rotates around an axis of rotation, the method including arranging a first measuring graduation that surrounds an axis of rotation around which an element rotates and arranging a second measuring graduation that surrounds the axis of rotation. Scanning the first measuring graduation along a first direction having a component along the axis of rotation, wherein the scanning the first measuring graduation takes place in at least three locations, which are spaced apart from each other in a circumferential direction surrounding the axis of rotation. Scanning the second measuring graduation along a second direction that is linearly independent of the first direction, wherein the scanning the second measuring graduation takes place in at least three locations, which are spaced apart from each other in the circumferential direction surrounding the axis of rotation.

The device in accordance with the invention includes a material measure arranged coaxially with respect to the element to be measured, for example a turntable, and two measuring graduations provided on the material measure, which surround the axis of rotation of the material measure in a ring shape and which are embodied for scanning two directions which are linearly independent of each other. In this case at least one measuring graduation is intended for scanning along a direction which has a component along the axis of rotation, and at least three measuring heads, which are spaced apart from each other along the circumference of the material measure, are assigned to each material measure for scanning the respective measuring graduation.

The material measure can be a test member which can be connected with the element to be measured. However, the material measure can also be integrated into the element to be measured (for example a turntable).

By scanning one of the measuring graduations by means of three measuring heads, which are spaced apart from each other along the circumference of the material measure, it is possible to determine the linearly independent individual deviations of the axis of rotation with respect to the predetermined ideal axis. Since the two measuring graduations are also being scanned along two directions which are linearly independent of each other (i.e., they cannot be transferred into each other by a linear linkage), it is possible in this way to determine six individual deviations, i.e. to detect all individual deviations with respect to an ideal rotational movement around a predetermined axis.

Figure 7:
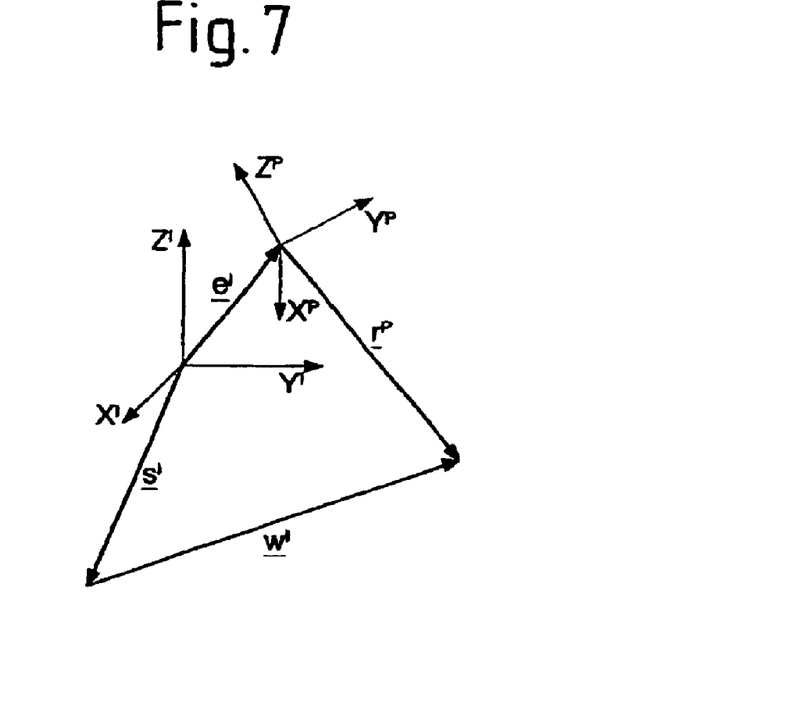
FIG. 7 shows a geometric representation of the actual movement of the turntable of FIG. 1 to be surveyed.
Figure 8:
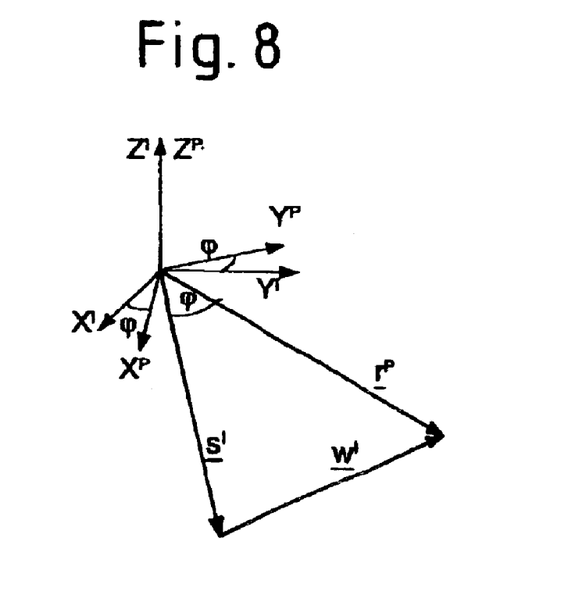
FIG. 8 shows a geometric representation of the desired movement of the turntable of FIG. 1 to be surveyed.

The determination of the individual deviations from the values which can be measured by means of the device of the invention are explained in detail further down by means of FIGS. 7 and 8.

The attainment of the object in accordance with the invention has the advantage that the determination of all six individual deviations can be performed simultaneously, position-dependent and continuously with a measuring arrangement by a contactless-operating, high-resolution and highly accurate measuring method. By this a complete compensation of all deviations from an ideal rotational movement is made possible with a single measurement in that the individual deviations are taken into consideration by calculation in the course of later applications.

The device in accordance with the invention can be used, inter alia, for acceptance tests and the calibration of turntables on the basis of a static or dynamic measurements of the turntable, for the determination of positioning and reversal errors, for performing step-response tests and for determining thermal drift.

Moreover, in the course of employment in regulated operations an ONLINE compensation of eccentricity deviations is made possible. In particular, in accordance with a further development of the invention it can be provided that a correction of the measured values, which are detected during the operation of the turntable or any other rotatable element for determining its position, in particular angles of rotation, is made immediately (ONLINE correction).

In a preferred embodiment of the invention, the two measuring graduations can be scanned vertically with respect to each other. If the two measuring graduations are formed by line graduations, this can be performed in a simple manner in that the lines of one measuring graduation extend vertically with respect to the lines of the other measuring graduation. For example, one measuring graduation can be scanned in the axial direction, i.e. parallel with the axis of rotation, and the other measuring graduation can be scanned in a tangential direction with respect to the axis of rotation.

The measuring graduations can in particular be constituted by incremental measuring graduations; however, the use of measuring graduations providing an absolute position information is also easily possible.

In a particularly preferred embodiment of the invention, the two measuring graduations are formed by a cross grating graduation extending on a surface of the material measure, in particular of a cylindrical material measure, along its circumference. The cross grating graduation can be formed by two line graduations extending vertically with respect to each other, as well as by a chessboard graduation.

On the other hand, the two measuring graduations can also be arranged spatially separated, for example one measuring graduation on a surface of the material measure, and the other measuring graduation on a circular ring projecting outward away from the surface.

The resulting measuring direction from the two measuring directions along which the measuring graduations are scanned preferably forms, together with the axis of rotation, a pair of straight lines, which are skewed with respect to each other, at each measuring point, i.e. the straight line on which the resulting measuring direction is located extends neither parallel to the axis of rotation nor intersects it.

It is possible by means of an additional reference marker track to compensate the so-called long-wave graduation error by using a correction table. Further than that it is possible to use the reference pulse for triggering the measurement.

When using a cylindrical material measure, its diameter (vertically with respect to the axis of rotation) should be selected to be as large as possible in order to be able to detect individual deviations by means of the greatest possible resolution.

In accordance with a variant of the invention, three measuring heads are provided for scanning the two measuring graduations, each of which scans two measuring graduations. In this case therefore the same measuring heads are used for scanning both measuring graduations. This variant of the invention can be advantageously employed in particular in those cases in which the two measuring graduations are constituted by a cross graduation. In this case the three measuring heads are designed as cross grating measuring heads, by means of which the cross grating graduation can be scanned.

Preferably the three measuring heads are arranged at a distance of respectively 120°—in relation to the axis of rotation of the material measure—along the circumference of the material measure.

In accordance with another variant of the invention, six measuring heads are provided for scanning the two measuring graduations, wherein three measuring heads are assigned to each measuring graduation. In this case, for example three measuring heads scan the one measuring graduation in the axial direction, and three further measuring heads scan the other measuring graduation in the axial direction. For this purpose the measuring heads provided for scanning the one and the other measuring graduation are each arranged alternatingly one behind the other along the circumference of the material measure, preferably at an angular distance of respectively 60°.

When employing six measuring heads in particular, in a further development of the invention these can be advantageously wired to each other in such a way, that the position, in particular the actual angle of rotation, of the rotatable element can be determined by means of the measured values from the individual measurable quantities produced from the output signals, by means of which an immediate correction (ONLINE correction) of the position, or the angular measured value affected by tolerances, is made possible in the course of performing a measurement.

For this purpose the measuring heads are wired together in such a way that the measured values from the measuring heads intended for the (axial) scanning of the one measuring graduation are linked for forming second order terms, and that the measured values of the measuring heads intended for the (tangential) scanning of the other measuring graduation are linearly inserted into the determination of the angle of rotation.

Besides the three, or six, measuring heads required for scanning the two measuring graduations, at least one additional measuring head can be provided for generating a redundant output signal. Thus, instead of three measuring heads at angular distances of 120° each, it is possible, for example, to arrange respectively four measuring heads at an angular distance of 90° each along the circumference of the material measure. Because of this, there is the possibility of compensating higher order errors, for example second order eccentricity errors (elliptical graduation), or second order axial wobble (curved graduation).

Preferably all measuring heads are fastened on a common support in order to be able to fix a defined relative arrangement, wherein the support must be fixed in place in a suitable manner, for example on a machine tool spindle in case of measuring a turntable.

The material of the holder must be selected in such a way that its thermal expansion behavior corresponds to that of the support of the measuring graduation. In this case a test member itself can be used as the support of the measuring graduation, for example, or the measuring graduation is provided on a separate measuring tape fastened on the test member.

The method in accordance with the present invention for detecting the rotational movement of an element rotatably seated around an axis is distinguished by a method for detecting rotational movement of an element which rotates around an axis of rotation, the method including arranging a first measuring graduation that surrounds an axis of rotation around which an element rotates and arranging a second measuring graduation that surrounds the axis of rotation. Scanning the first measuring graduation along a first direction having a component along the axis of rotation, wherein the scanning the first measuring graduation takes place in at least three locations, which are spaced apart from each other in a circumferential direction surrounding the axis of rotation. Scanning the second measuring graduation along a second direction that is linearly independent of the first direction, therein the scanning the second measuring graduation takes place in at least three locations, which are spaced apart from each other in the circumferential direction surrounding the axis of rotation.

In the course of executing the method of the invention, the material measure is rotated, preferably by at least one revolution, around its axis of rotation in relation to the locations (measuring heads), where the scanning of the material measure is performed. In this connection it is unimportant whether the material measure or the means (measuring heads) provided for scanning the material measure are rotated for performing this relative movement.

The method of the invention is suitable for determining individual deviations of the rotatable elements within the framework of a calibration measurement in order to be able to compensate these individual deviations during subsequent measurements, as well as for a direct ONLINE compensation of the individual deviations of the rotatable element.

Further features and advantages of the invention will become apparent in the course of the subsequent description, making reference to the drawings.

Shown are in:

BRIEF DESCRIPTION OF THE DRAWING

FIG. 1 schematically shows a perspective representation of a turntable arranged on a machine foundation, FIG. 2 schematically shows a perspective representation of a first embodiment of a test member provided with a cross grating graduation in accordance with the present invention, which can be connected with the turntable in FIG. 1 for determining individual deviations of the axis of rotation of the turntable, FIG. 3 schematically shows a variation of the cylindrical test member in FIG. 2, having two separate measuring graduations, FIG. 4 schematically shows a first embodiment of an arrangement for scanning the test member in FIG. 2 in accordance with the present invention;

DESCRIPTION IF THE PREFERRED EMBODIMENT(S) OF THE INVENTION

Figure 1:
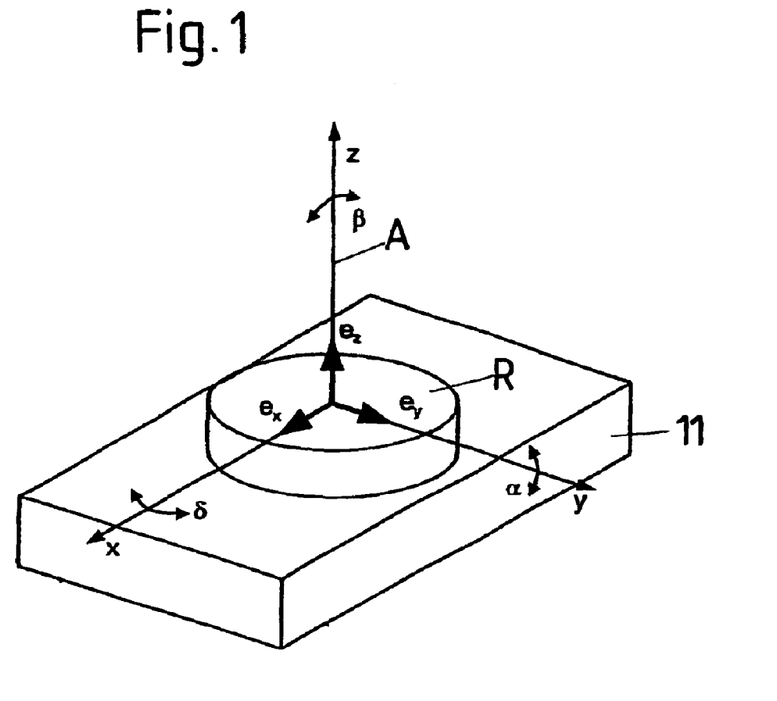

A machine foundation M with a turntable R, which has a turntable axis A, and which can be rotated (for example for processing a workpiece), is schematically represented in FIG. 1.

The object of the present invention is the detection of a rotational movement around this axis A for determining deviations from an ideal rotational movement around a predetermined desired axis. Thus, as a result the individual deviations of the turntable axis A in regard to an ideal axis are determined.

Of importance here is in particular the detection of systematic errors, which can be systematically taken into consideration in the course of the control of the turntable. In the course of this the detection of the individual deviations can take place, on the one hand, within the framework of a calibration measurement in order to be able to take them into account during subsequent measurements using the turntable or, on the other hand, for the immediate ONLINE correction, or compensation, of the individual deviations in the course of performing a measurement.

The individual deviations are composed of three so-called translatory deviations and three so-called rotary deviations.

A first translatory deviation $e_z$ relates to the axial deviation along the axis A which, in the present example, coincides with the z-direction of the coordinate system represented in FIG. 1 (local coordinate system, or non-rotating coordinate system of the turntable).

Two further translatory deviations ex and ey relate to the translatory deviation in two spatial directions extending perpendicularly with respect to each other vertically to the axis A. In the present example, these two spatial directions correspond to the x-axis and y-axis of the Cartesian coordinate system, wherein the axis A defines the z-axis. The deviations, identified by the two last mentioned individual deviations ex and ey from an ideal rotational movement around a predetermined desired axis, describe the eccentricity (eccentric deviation) of the actual rotational movement.

Of the three rotary individual deviations, one (δ) relates to the rotary deviation around the axis A (z-axis). This deviation (δ) is called a positioning deviation (angular error) around the local z-axis.

The other two rotary individual deviations α and β identify the rotary deviation with respect to the x- or y-axis. Such deviations lead to a tumbling movement.

The angle of rotation error (positioning deviation) is here determined by reference to a guide value, in particular by reference to a shaft, which drives the turntable (and therefore also the test member connected with the turntable).

Figure 2:
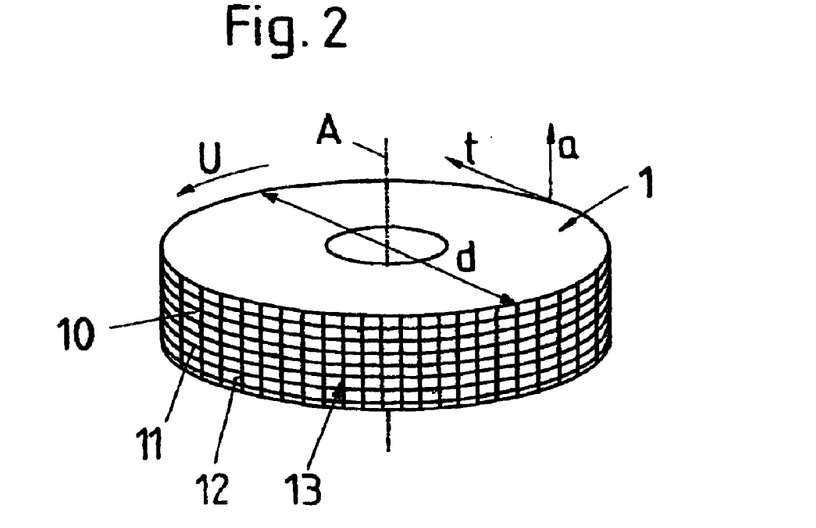

A material measure in the form of a test member of the type represented in FIG. 2 can be used for detecting the six deviations (movement errors or a rotational movement) represented in FIG. 1 and explained above in one measurement.

This test member is a cylindrical test member 1, which is connected with the turntable R in FIG. 1 for detecting the individual deviations in such a way that the axis of rotation A (center axis) of the cylindrical test member 1 and the turntable axis A coincide.

On its outer surface 10, the cylindrical test member 1 has a cross grating graduation 13. The latter consists of a first incremental line graduation 11 with a plurality of parallel graduating lines, which extend in the circumferential direction U of the test member 1 and are arranged at a constant distance from each other. The graduation lines of a second graduation 12 extend perpendicularly with respect to the graduating lines of this first graduation 11. Each of the latter extends parallel with the axis of rotation A of the test member 1 (i.e. in the axial direction), and are also arranged at a constant distance from each other, so that again an incremental measuring graduation results.

By scanning the cross grating graduation 13 by means of suitable measuring heads, it is possible to determine the six individual deviations $e_x$, $e_y$, $e_z$, α, β and δ in the course of a rotational movement around the axis of the turntable R represented in FIG. 1 in one single measurement, and this in a manner positionally dependent for each position occurring during the rotational movement. This will be explained in greater detail in what follows by means of FIGS. 4 and 5.

Figure 3:
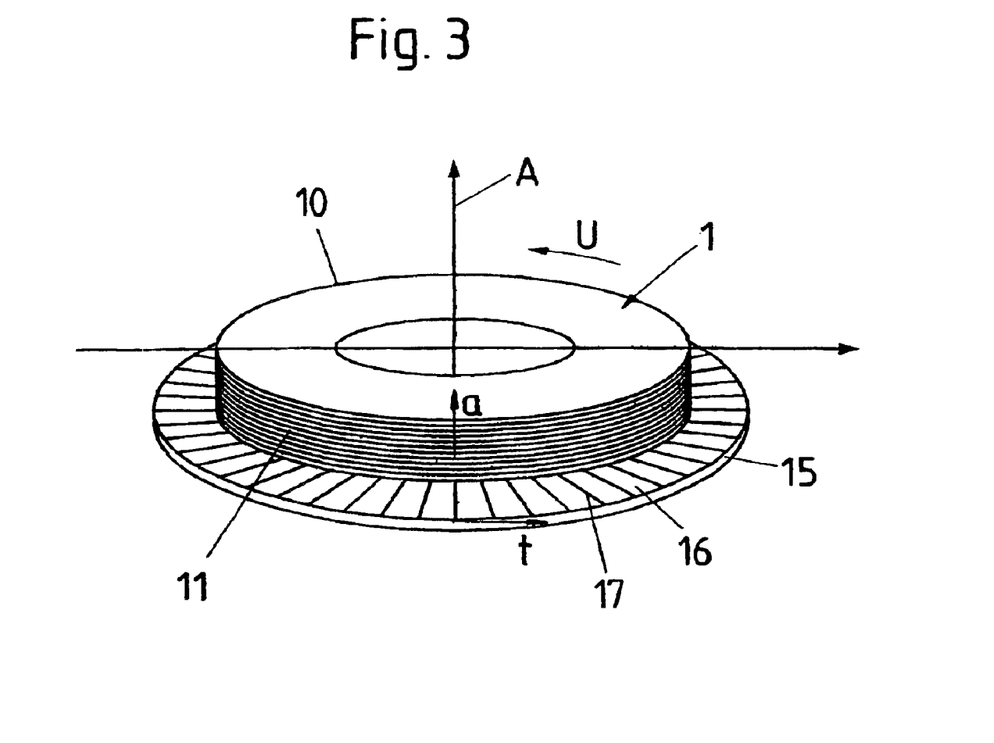

A further exemplary embodiment of a cylindrical test member is represented in FIG. 3. In this case the cylindrical test member 1 has only one measuring graduation 11 on its outer surface 10, which consists of a plurality of lines, which are arranged at a constant distance from each other and extend along the circumference U of the test member 1.

A second measuring graduation 17 is provided on a ring 15 extending along the circumference of the cylinder-shaped test member 1 and constitutes a circular surface 16, which projects vertically away from the surface 10 of the test member 1. The measuring graduation 17 provided on this surface 16 consists of a plurality of lines, spaced apart from each other along the circumference U of the test member 1, each of which extends in the radial direction in relation to the axis of rotation A of the cylindrical test member 1.

To sum up, in the exemplary embodiment in FIG. 2, as well as in the exemplary embodiment in FIG. 3, the lines of the one measuring graduation 11 extend in the circumferential direction and are spaced apart from each other in the axial direction. This measuring graduation 11 can therefore be scanned in the axial direction a (parallel with the axis of rotation).

The lines of the other measuring graduation 12 or 17 each extend vertically in relation to the lines of the first measuring graduation 11 and are spaced apart from each other along the circumference U of the cylindrical test member 1. Thus, the other measuring graduation 12 or 17 can be scanned in the tangential direction t.

However, in this connection it is not absolutely necessary that the lines of the first graduation 11 extend exactly along the circumferential direction U, and the lines of the second graduation 12 or 17 vertically with respect to the lines of the first graduation 11. Instead, an inclined course of the lines of the individual graduations 11, 12, 17 is also conceivable. It is only crucial that the one graduation can be scanned in the axial direction and the other graduation in a direction vertically to the first. It is sufficient for this that the lines of the first graduation 11 have a component along the circumference U of the cylindrical test member 1, and that the lines of the other measuring graduation 12 or 17 have a component vertically in relation to the circumferential direction U.

The measuring direction resulting from the axial and the tangential measuring directions a or t is located (at any arbitrary measuring point at the circumference of the test member 1) on a straight line, which is oriented skewed with respect to the axis of rotation A. This means that the respective straight line extends neither parallel to the axis of rotation, nor does it intersect the latter. The said straight line also does not extend in a plane located vertically with respect to the axis of rotation A.

Figure 4:
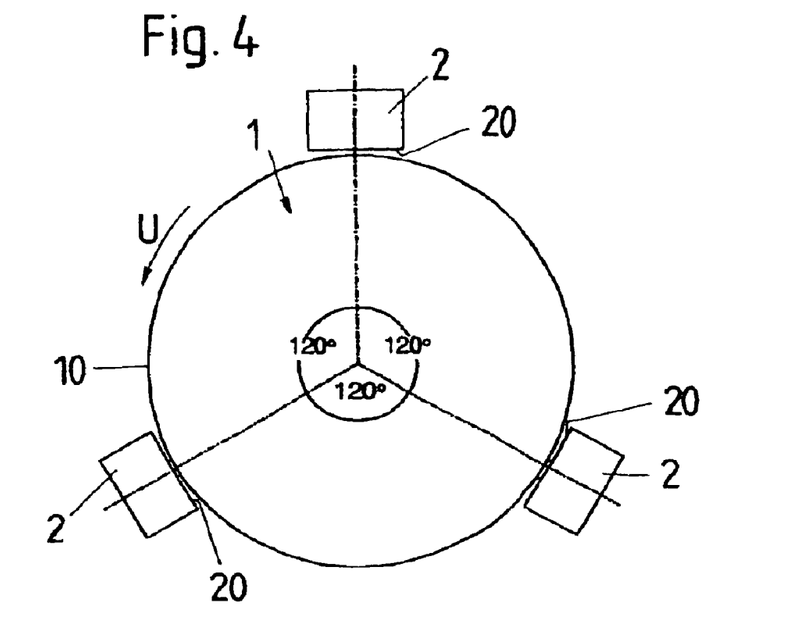

An arrangement for scanning the cylindrical test member 1 with a cross grating 13 is represented in FIG. 4. This arrangement comprises three measuring heads 2 in the form of cross grating reading heads, which are spaced apart from each other along the circumference U of the cylindrical test member 1 at a constant angular distance of 120°. On each of their surfaces 20 facing the surface 10 of the cylindrical test member 1, these measuring heads 2 have a cross grating, see FIG. 6a in this connection, in which the surface 20 which is facing the surface 10 of the measuring heads 2 embodied as cross grating reading heads can be seen.

The cross grating 11 on the surface 10 of the cylindrical test member 1 can be scanned by means of each one of these measuring heads 2 in the tangential direction t (see FIG. 2), as well as in the axial direction (parallel with the axis of rotation A). In this case the scanning takes place at three locations, which are spaced apart along the circumference U of the cylindrical test member 1, where the three measuring heads 2 have been placed.

Figure 5:
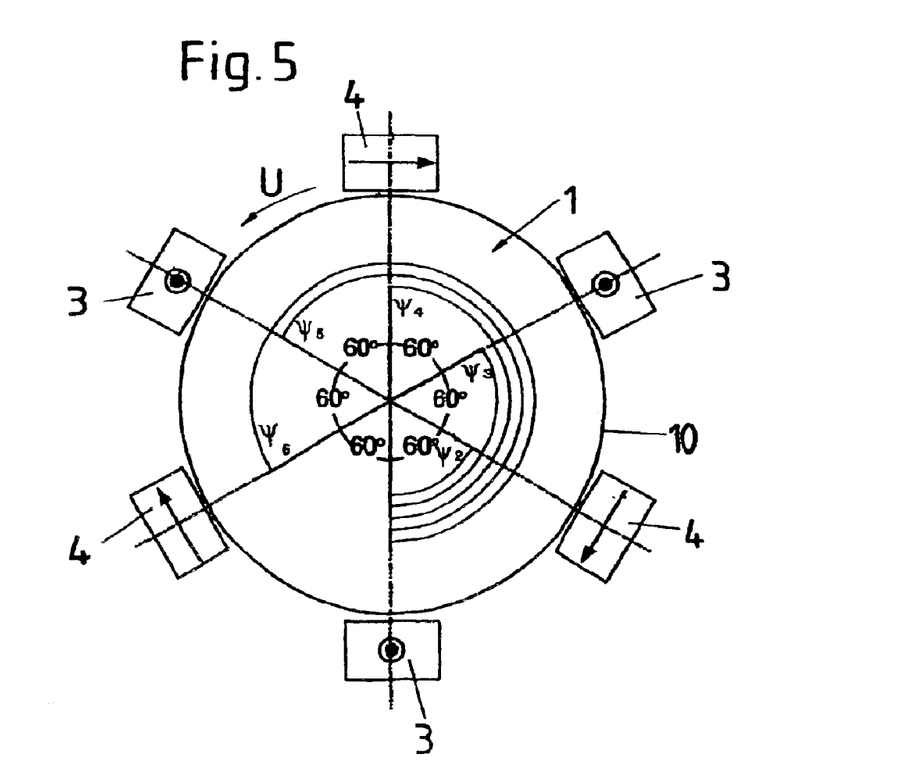
FIG. 5 schematically shows a second embodiment of an arrangement for scanning the test member in FIG. 2 in accordance with the present invention.

In the exemplary embodiment of FIG. 5, an arrangement of six measuring heads 3, 4 is used for scanning the cylindrical test member 1, which is provided with a cross grating 13 on its surface 10, of which three measuring heads 3 scan the cross grating 13 (see FIG. 2) in the axial direction, and of which three further measuring heads 4 scan the cross grating 13 in the tangential direction. The measuring heads 3, 4 are arranged along the circumference U of the cylindrical test member at regular angular distances of 60°, wherewith respectively axially scanning measuring heads 3 and tangentially scanning measuring heads 4 are alternatingly arranged. Accordingly, the angles $\psi_2$ to $\psi_6$ have the values of 60°, 120°, 180°, 240° and 300°.

In both cases, i.e. with the arrangement in accordance with FIG. 4, as well as with the arrangement in accordance with FIG. 5, it is possible to obtain information, in particular regarding the individual deviations $e_z$, α and β by means of a measuring graduation, which determine the axial error and tumbling, and by scanning in the tangential direction, information in particular regarding the individual deviations $e_x$, $e_y$ and δ, which determine the eccentricity and the positioning deviation (angular error).

In this case the arrangement in accordance with FIG. 5 is particularly suited for scanning a test member of the type represented in FIG. 3, wherein the scanning faces of the measuring heads must face the respectively assigned measuring graduation.

Figure 6A:
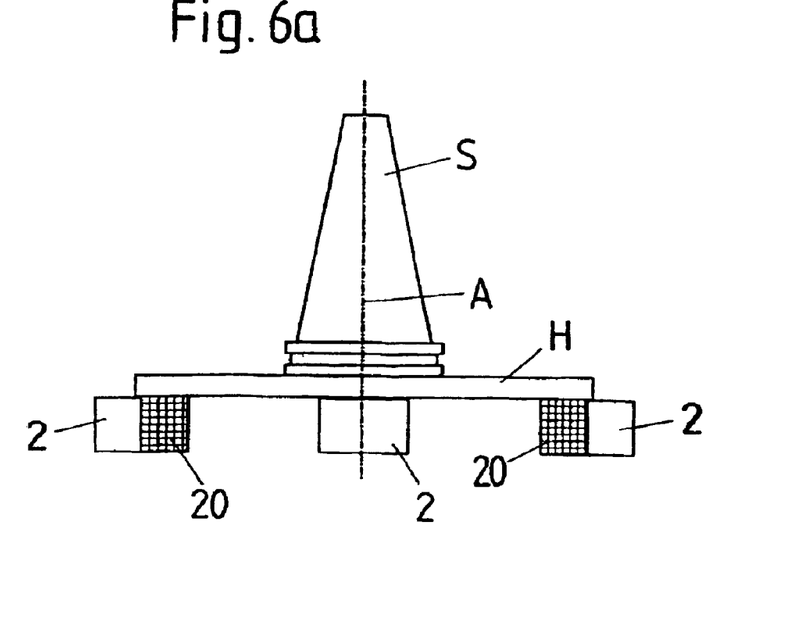
FIGS. 6a and 6b show two plan views of a clamping system in accordance with the present invention by which the test member can be fastened on the turntable to be surveyed.
Figure 6B:
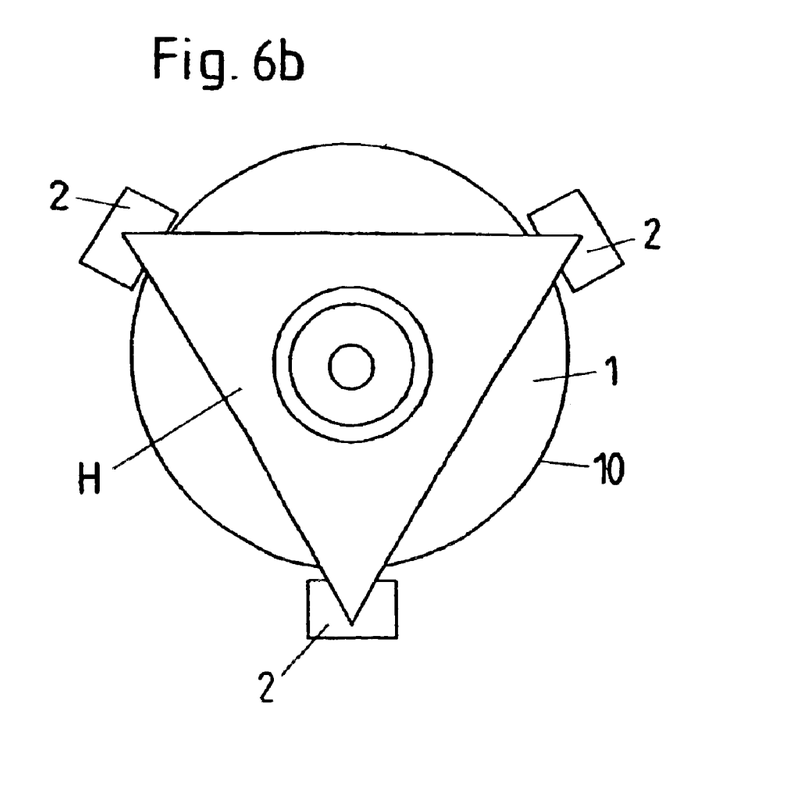

In accordance with FIGS. 6a and 6b, the measuring heads 2 (or 3, 4) are fastened on a common support H, which assures a defined relative position of the measuring heads 2. The support H must be fixed in place, uncoupled from the axis of rotation A of the turntable, or of the test member. For this purpose it can be fixed in place by means of a conventional clamping system S in relation to the spindle of a machine tool, for example, whose turntable is to be surveyed.

In this connection the positioning of the triangularly-shaped support H and the three measuring heads 2 fastened thereon in relation to the test member 1 and its outer surface 10 can be seen in a view from above in FIG. 6b. In the lateral view in accordance with FIG. 6a, however, the test member 1 is not represented in order to make the individual measuring heads 2 and their surfaces 20 (scanning surfaces) facing the surface 10 of the test member 1 better visible.

In what follows it will be explained by means of FIGS. 7 and 8 how the six individual deviations of a turntable, obtained in the course of performing a measurement by the above described arrangements, from the measured values for six measurable quantities, can be determined.

For performing a measurement with the aim of determining the six above defined independent deviations, the turntable is rotated by at least one revolution with respect to the coordinate system of a fixed part of the appropriate machine tool, and therefore relative to the coordinate system of the measuring heads. In the ideal case, the rotation of the turntable is purely a rotational movement around a predetermined axis. However, because of production and assembly tolerances, the turntable performs in fact an interfering movement, which is superimposed on the purely rotational movement and is to be determined and compensated.

In accordance with FIGS. 7 and 8, the description of the general rotational movement of the turntable requires two coordinate systems, wherein FIG. 7 relates to the actual movement and FIG. 8 to the desired movement of the turntable. In this case let the coordinate system I be the spatially fixed system (coordinate system of the appropriate machine tool, or of the measuring heads), with respect to which the movement of the turntable is described, wherein its own coordinate system P is assigned to the latter, in which the geometry of the turntable is defined.

The orthogonal transformation $$\underline{T}_i^{PI},$$

exists between these two coordinate systems, which transforms the coordinate system P into the coordinate system I. In this case the quantity $\underline{w}_i^I$ of the actual movement results from the following vector equation $$\underline{w}_i^I = \underline{e}^I - \underline{s}^I + \underline{T}_i^{PI} \cdot \underline{r}^P \quad (1)$$

wherein
$\underline{e}^I$ Eccentricity of the material measure
$\underline{s}^I$ Coordinates of the sensor head (measuring head)
$\underline{r}^P$ Radius vector of the material measure $$\underline{T}_i^{PI},$$

Rotation matrix
$\underline{w}_i^I$ Measured value of the actual movement.

The rotation matrix $$\underline{T}_i^{PI}$$

contains three rotation parameters $\alpha$, $\beta$ and $\gamma$, which describe the general rotation of the turntable in relation to the machine coordinate system. The angle of rotation $\gamma$ is composed of the actual measurable quantity (measurement angle) $\phi$ and the orientation error $\delta(\gamma=\phi+\delta)$. If initially only very small rotations as a whole are observed, the linearized rotation matrix $$\underline{T}_i^{PI}$$

is obtained $$\underline{T}_i^{PI} = \begin{bmatrix} 1 & -(\varphi+\delta) & \beta \\ \varphi+\delta & 1 & -\alpha \\ -\beta & \alpha & 1 \end{bmatrix} \quad (2)$$

The desired movement of the turntable is described by the rotation around a fixed axis of rotation. In accordance with FIG. 8, this rotation can be very simply described as $$\underline{w}_s^I = -\underline{s}^I + \underline{T}_s^{PI} \cdot \underline{r}^P \quad (3)$$

wherein
$\underline{w}_s^I$ Measurable quantity of the desired movement $$\underline{T}_s^{PI}$$

Rotation of the desired movement
If here, too, initially only very small rotations are observed, the rotation matrix $$\underline{T}_s^{PI}$$

results as $$\underline{T}_s^{PI} = \begin{bmatrix} 1 & -\varphi & 0 \\ \varphi & 1 & 0 \\ 0 & 0 & 1 \end{bmatrix} \quad (4)$$

If now the difference between the equations (1) and (3) is formed, the deviations of the actual movement from the desired movement of the turntable is obtained $$\tilde{\underline{w}}^I = \underline{w}_i^I - \underline{w}_s^I = \underline{e}^I + (\underline{T}_i^{PI} - \underline{T}_s^{PI}) \cdot \underline{r}^P \quad (5)$$

The associated rotation matrix results as $$\tilde{\underline{T}}^{PI} = \underline{T}_i^{PI} - \underline{T}_s^{PI} = \begin{bmatrix} 0 & -\delta & \beta \\ \delta & 0 & -\alpha \\ -\beta & \alpha & 0 \end{bmatrix} \quad (6)$$

Related to the inertial coordinate system I, the turntable has exactly three single errors in the sense of the rigid body degrees of freedom
Eccentricity $\underline{e}^I$: Translatory deviations in the direction of the coordinate system I Angle error $\underline{\tilde{\imath}}^{Pl}$:

Tumble error and orientation error α, β, and δ

These six individual errors can be detected by means of the described measuring arrangement.

Since the entire system is linearized, it is possible to find a transformation rule A, which projects the geometric deviations $$\underline{\epsilon} = (e_x\ e_y\ e_x\ \alpha\ \beta\ \delta)^T \quad (7)$$

on the measurable quantities $$\underline{\tilde{w}} = (w_{1z}\ w_{2y}\ w_{3z}\ w_{4y}\ w_{5z}\ w_{6y})^T \quad (8)$$

in accordance with equation (5).

$$\underline{\tilde{w}} = \underline{A} \cdot \underline{\epsilon} \quad (9)$$

$$\underline{A} = \begin{bmatrix} 0 & 0 & 1 & r \cdot S\psi_1 & -r \cdot C\psi_1 & 0 \\ -S\psi_2 & C\psi_2 & 0 & 0 & 0 & r \\ 0 & 0 & 1 & r \cdot S\psi_3 & -r \cdot C\psi_3 & 0 \\ -S\psi_4 & C\psi_4 & 0 & 0 & 0 & r \\ 0 & 0 & 1 & r \cdot S\psi_5 & -r \cdot C\psi_5 & 0 \\ -S\psi_6 & C\psi_6 & 0 & 0 & 0 & r \end{bmatrix}$$

wherein
S=̂sin and C=̂cos
$\psi_i$ positional angle of the i-th measuring head (FIG. 5)

The matrix A only contains geometric values resulting from the measuring arrangement. If this matrix A is inverted, the representation of the measuring errors +e,otl w+ee on the geometric deviation epsilon of the measuring arrangement is obtained.

$$\underline{\epsilon} = \underline{A}^{-1} \cdot \underline{\tilde{w}} \quad E(10)$$

wherein $$\underline{A}^{-1} = \begin{bmatrix} 0 & \frac{C\psi_6 - C\psi_4}{K_1} & 0 & \frac{C\psi_2 - C\psi_6}{K_1} & 0 & \frac{C\psi_4 - C\psi_2}{K_1} \\ 0 & \frac{S\psi_6 - S\psi_4}{K_1} & 0 & \frac{S\psi_2 - S\psi_6}{K_1} & 0 & \frac{S\psi_4 - S\psi_2}{K_1} \\ -\frac{S(\psi_3 - \psi_5)}{K_2} & 0 & \frac{S(\psi_1 - \psi_5)}{K_2} & 0 & -\frac{S(\psi_1 - \psi_3)}{K_2} & 0 \\ \frac{C\psi_5 - C\psi_3}{r \cdot K_2} & 0 & \frac{C\psi_1 - C\psi_5}{r \cdot K_2} & 0 & \frac{C\psi_3 - C\psi_1}{r \cdot K_2} & 0 \\ \frac{S\psi_5 - S\psi_3}{r \cdot K_2} & 0 & \frac{S\psi_1 - S\psi_5}{r \cdot K_2} & 0 & \frac{S\psi_3 - S\psi_1}{r \cdot K_2} & 0 \\ 0 & \frac{S(\psi_4 - \psi_6)}{r \cdot K_1} & 0 & -\frac{S(\psi_2 - \psi_6)}{r \cdot K_1} & 0 & \frac{S(\psi_2 - \psi_4)}{r \cdot K_1} \end{bmatrix}$$

and $K_1 = S(\psi_2-\psi_4)-S(\psi_2-\psi_6)+S(\psi_4-\psi_6)$ $K_2 = S(\psi_1-\psi_5)-S(\psi_1-\psi_3)-S(\psi_3-\psi_5)$ S=̂sin und C=̂cos The equation (10) describes the actual calibration problem, by which it is possible to deduce the geometric deviations of the turntable.

Figure 9:
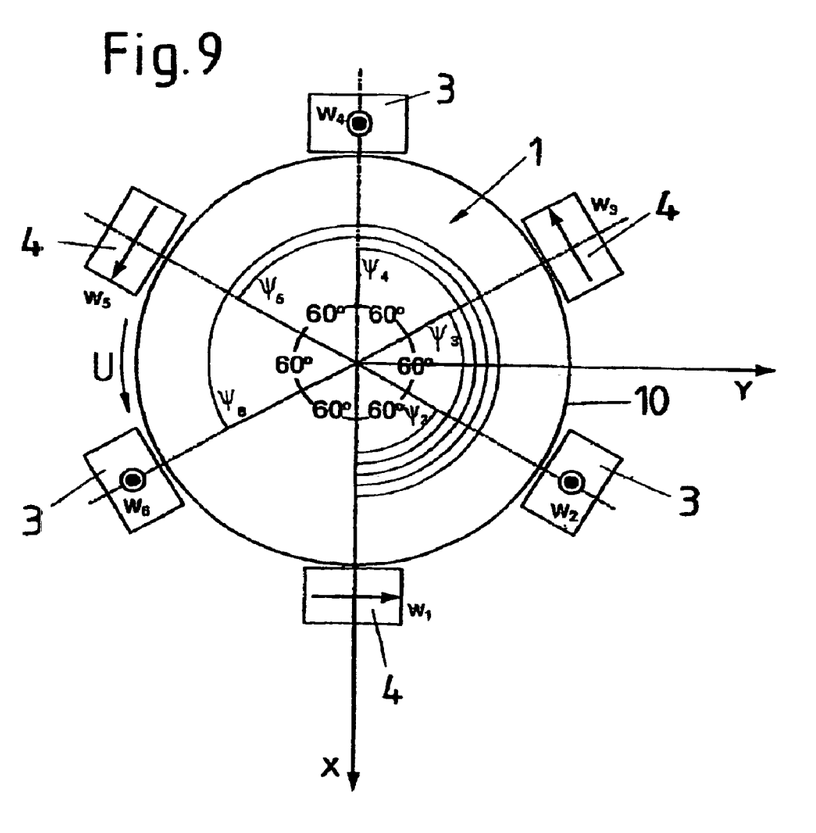
FIG. 9 shows an arrangement in accordance with FIG. 5, which is intended in particular for an ONLINE correction of individual deviations in the course of performing a measurement in accordance with the present invention.

An arrangement of six measuring heads 3, 4, comparable to the arrangement in FIG. 5, for scanning the cylindrical test member 1, which is provided with a cross grating graduation 13 on its surface 10, is represented in FIG. 9, wherein three measuring heads 3 scan the cross grating graduation 13 (see FIG. 2) in the axial direction, and three further measuring heads 4 scan the cross grating graduation 13 in the tangential direction. The measuring heads 3, 4 are arranged in regular angular spacing of 60° along the circumference U of the cylindrical test member, wherein axially scanning measuring heads 3 and tangentially scanning measuring heads 4 are alternatingly arranged. Accordingly, the angles $\psi_2$ to $\psi_6$ shown in FIG. 5 have the values of 60°, 120°, 180°, 240° and 300°. A special feature of the exemplary embodiment represented in FIG. 9 lies in the wiring of the measuring heads 3, 4 represented in FIG. 10.

As can be seen by means of FIG. 9, the output signal of each one of the measuring heads 3, 4 forms a measured value for the measurable quantity $w_1$, $w_2$, $w_3$, $w_4$, $w_5$ or $w_6$, which is to be determined by the respective measuring head 3, 4 by scanning the testing member 1. In accordance with FIG. 10, the measuring heads 3, 4 are wired in such a way that for determining the exact angle of rotation of the test member 1 (and therefore also of the turntable connected therewith), the measured values of the quantities $w_2$, $w_4$, $w_6$ to be measured by the measuring heads 3 scanning the cross grating graduation of the test element 1 are entered with second order terms into the determination of the exact angle of rotation of the test member. In contrast thereto, the measured values of the measurable quantities $w_1$, $w_3$, $w_5$ by the measuring heads 4 tangentially scanning the cross grating graduation are entered linearly into the corresponding equation. The exact form of the mentioned equation will be derived further down by means of FIG. 11.

Figure 10:
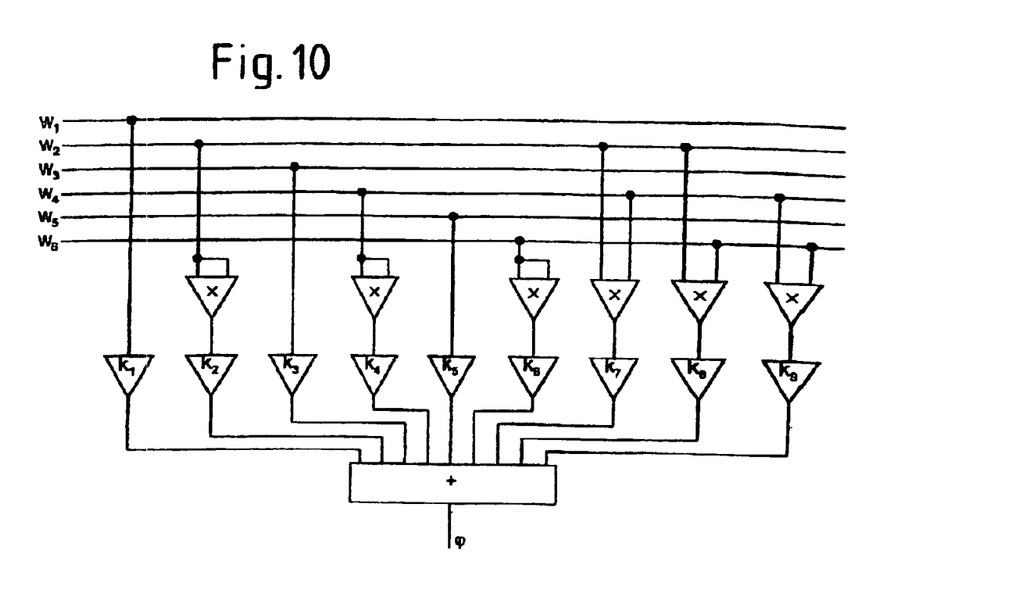
FIG. 10 schematically shows an embodiment wiring of the measuring heads in the arrangement in accordance with FIG. 9, which is suitable for an ONLINE correction in accordance with the present invention.

It should first be mentioned, however, that by means of the measuring arrangement for the complete determination of the movement state of a test member 1 by means of six measuring heads 3, 4 represented in FIG. 9, as well as the wiring of the measuring heads 3, 4 represented in FIG. 10, an immediate direct compensation (ONLINE compensation) of the individual deviations from an ideal rotational movement is possible in order to determine in this way the exact angle of rotation. In the course of this, the individual deviations caused during production, assembly or operation, or eccentricity errors, are taken into account. An essential advantage of the mentioned measuring principle lies in the possibility of handling the production, assembly and installation tolerances more liberally without affecting the measurement accuracy, i.e. to take less trouble in correcting them. The arrangement described in accordance with FIGS. 9 and 10 always measures the exact angle of rotation as a function of a rotating movement of the test member 1, even in case of substantial eccentricity and run-out errors of the material measure (test element 1 with the cross grating graduation 13 provided on its surface 10). As will be shown in what follows, the only requirement for this is that the basic mathematical problem can be linearized, i.e. that the occurring individual deviations have a value which permits linearization without a noticeable loss of accuracy.

As a result, an angular measuring device for a direct measurement of the angle of rotation of turntables is created by means of the arrangements described in FIGS. 9 and 10, which makes comparatively low demands on the production and assembly tolerances with respect to the mechanical parts of the measuring device. The individual deviations of the material measure of the turntable (test member 1 with the assigned cross grating graduation), in particular eccentricity and run-out errors of the material measure in relation to the stator of the measuring system (measuring heads for scanning the cross grating graduation), can be completely compensated by means of suitable wiring.

In contrast to the measuring methods, particularly those explained by means of FIGS. 4, 5, 7 and 8, it is not intended here for the purpose of an initial calibration to merely detect an individual deviation in order to be able to take it into consideration in the course of subsequent measurements of the angle of rotation, instead it is possible to perform an immediate compensation of the individual deviations in the course of the angular measurement (ONLINE compensation).

Figure 11:
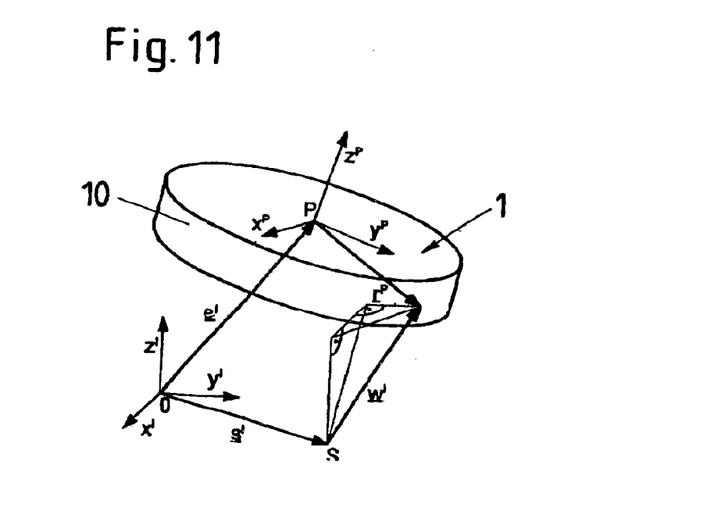
FIG. 11, shows a geometric representation of the actual movement of the turntable of FIG. 1 to be surveyed, wherein it is intended to perform an ONLINE correction by means of the arrangement in FIGS. 9 and 10 in accordance with the present invention.

The equation for determining the angle of rotation of the test member 1, and therefore of the associated rotatable element (for example a turntable) will be derived in what follows by means of FIGS. 9 and 10, together with FIG. 11, in which the actual movement of a test member 1 is represented. The derivation is similar to the derivation of the calibration problem represented by means of FIGS. 7 and 8, by means of which it is possible to make conclusions regarding the geometric deviations of a turntable. However, a difference consists in that in what follows a transformation of the measured value $w_j$ into the coordinate system of the corresponding measuring head (sensor head) takes place.

In accordance with FIG. 11, the description of the general rotation of the material measure requires two coordinate systems. Let the coordinate system I be the spatially fixed system (stator-fixed system), with respect to which the movement of the turntable is described. Let the geometry of the material measure be defined by the coordinate system P. Let the orthogonal transformation TPI, which transforms the coordinate system P of the material measure into the coordinate system I, exist between these two coordinate systems. Then the measurable quantity wj at the j-th sensor head results from the following equation $$w_j = [\underline{T}^{IS} \cdot (\underline{e}^I - \underline{s}_j^I + \underline{T}^{PI} \cdot \underline{r}^P)]^T \cdot \underline{n}^s \qquad (1')$$

wherein e=eccentricity of the material measure $e=(e_x, e_y, e_z)^T$ s=the coordinates of the sensor head (measuring head)

r=radius vector of the material measure $T^{PI}$=rotation matrix P→I $T^{IS}$=rotation matrix I→S (S coordinate system of the j-th sensor head)

$n^s$=unit vector of the sensor coordinate system in the measuring direction of the sensor head $w_j$=measurable quantity of the actual movement at the j-th sensor head (j=1, . . . , 6)

The rotation matrix TPI contains three rotational parameters $\alpha$, $\beta$, and $\gamma=\phi+\delta$, which describes the general rotation of the material measure in relation to the stator. The vector e characterizes the eccentricity of the material measure, as well as its axial movement. A total of six deviations results, which can continuously change as a function of their manufacture or operation. These six deviations are combined in the vector $e=(e_x, e_y, e_z, \alpha, \beta, \delta)^T$. The six measurable quantities wj are also combined in a vector w.

If the Jacobi matrix J is formed for the equation (1'), a relationship between the measurable quantities w and the deviation epsilon results $$\underline{w}=\underline{J}\cdot\underline{\epsilon} \qquad (2')$$

$$\underline{J} = \begin{bmatrix} \frac{\partial w_1}{\partial e_x} & \frac{\partial w_1}{\partial e_y} & \cdots & \frac{\partial w_1}{\partial \delta} \\ \frac{\partial w_2}{\partial e_x} & \frac{\partial w_2}{\partial e_y} & \cdots & \frac{\partial w_2}{\partial \delta} \\ \vdots & \vdots & \ddots & \vdots \\ \frac{\partial w_6}{\partial e_x} & \frac{\partial w_6}{\partial e_y} & \cdots & \frac{\partial w_6}{\partial \delta} \end{bmatrix}$$

wherein

If the Jacobi matrix is linearized by setting $\sin\alpha\approx\alpha$, $\cos\alpha\approx 1$, $\sin\beta\approx\beta$,
$\cos\beta\approx 1$, $\sin\delta\approx\delta$, $\cos\delta\approx 1$ and the higher order expressions are neglected, the following results $$\underline{J} = \begin{bmatrix} -\sin\psi_1 & \cos\psi_1 & 0 & -r\sin\psi_1(\alpha\cos\psi_1-\beta\sin\psi_1) & r\sin\psi_1(\beta\cos\psi_1-\alpha\sin\psi_1) & r \\ 0 & 0 & 1 & r\sin\psi_2 & -r\cos\psi_2 & 0 \\ -\sin\psi_3 & \cos\psi_3 & 0 & -r\sin\psi_3(\alpha\cos\psi_3-\beta\sin\psi_3) & r\sin\psi_3(\beta\cos\psi_3-\alpha\sin\psi_3) & r \\ 0 & 0 & 1 & r\sin\psi_4 & -r\cos\psi_4 & 0 \\ -\sin\psi_5 & \cos\psi_5 & 0 & -r\sin\psi_5(\alpha\cos\psi_5-\beta\sin\psi_5) & r\sin\psi_5(\beta\cos\psi_5-\alpha\sin\psi_5) & r \\ 0 & 0 & 1 & r\sin\psi_6 & -r\cos\psi_6 & 0 \end{bmatrix}$$

If now the inverse of the Jacobi matrix is formed, the following is obtained from the equation (2')

$$\underline{\epsilon}=\underline{J}^{-1}\cdot\underline{w} \qquad (3')$$

Since the Jacobi matrix still contains the variables alpha and beta in linear form, the equation (3) is explicitly solved for the values $e_x$, $e_y$, $e_z$, $\alpha$, $\beta$, $\delta$ and is represented as a function of the six measurable quantities w. In this case the representation of the position angle error delta as a function of the six measurable quantities w is of particular interest. The following is obtained $$\delta = f(w_1, w_2, w_3, w_4, w_5, w_6). \quad (4')$$

It should be noted that the measuring heads which scan the cross grating drum in the axial direction by means of the measurable quantities $w_2$, $w_4$, $w_6$ only measure interference movements of the graduation. In contrast thereto, the desired rotational movement of the graduated drum is superimposed on the interference movement of the measurable quantities $w_1$, $w_3$, $w_5$ by the translatory measuring sensors. It therefore applies that the interference movement in the translatory measuring direction is the difference between the desired movement $w_{soll}$ and the actual movement $\hat{w}$. The following applies $$w_j = w_{soll} - \hat{w}_j = r\phi - \hat{w}_j \ (j=1, 3, 5) \quad (5')$$

With the equation (5'), the following follows from equation (4'):

$$\delta = f(w_1, r\phi - \hat{w}_2, w_3, r\phi - \hat{w}_4, w_5, r\phi - \hat{w}_6)^1 = 0. \quad (6')$$

If in equation (6') the position angle error $\delta$ is made zero, and the equation is solved for the desired angle $\phi$, the desired angle $\phi$ follows as a function of the six measurable quantities w.

$$\phi = k_1 w_1 + k_2 w_2^2 + k_3 w_3 + k_4 w_4^2 + k_5 w_5 + k_6 w_6^2 + k_7 w_2 w^4 + k_8 w_2 w_6 + k_9 w_4 w(7') $$

The constant factors $k_i$ result from the geometric arrangement of the sensors and the graduation radius r. They must be calculated for each case of use (symbolically possible, but very complicated expressions).

The correction equation (7') makes an ONLINE correction of the angular measurement possible. Measuring errors inevitably occur in the course of the angular measurement because of production and assembly tolerances. If the six interference movements are directly measured by the use of six measuring heads, the effects of first order and second order angular errors can be compensated by a skillful wiring of the six individual measurable quantities (FIG. 10). The correction equation provides the wiring diagram, including parameterization, for the six measuring points in the respective geometric measuring arrangement.

While the correction equation is mathematically unequivocal, the parameters $k_i$ (i=1, 2, 3, 4, 5, 6, 7, 8, 9, ) in equation (7') are subject to some uncertainties. These uncertainties are caused in that the relative arrangement of the measuring heads, essentially these are the angles $\psi_j$ of the measuring heads and the graduation radius r (FIG. 9), must be exactly known in order to achieve an exact determination of the angle of rotation $\phi$. In actuality the values $\psi_j$ and r will also be subject to production-caused variations. It is therefore recommended to identify the constant factors $k_1$ for a sensor arrangement in accordance with FIG. 9 by means of a system measurement device. The advantage lies in that graduation errors of the graduated disk, production and assembly errors of the seating of the graduated disk, as well as uncertainties regarding the sensor arrangement are completely taken into account in the equation (7').

Eccentricity errors in the angular measurement have the effect of so-called 1-$\phi$ errors. But tumble errors lead to 2-$\phi$ errors. It is unimportant for the correction method whether the eccentricity error (1-$\phi$ error) is a result of assembly, production or installation errors, or is the result of a long-wave graduation error. It is also unimportant whether the tumble error (2-$\phi$ error) is the result of assembly, production or installation errors, or is the result of a long-wave graduation error.

In summation, the measuring arrangement described by means of FIGS. 9 to 11 offers the following advantages:

complete compensation of the measuring errors by means of suitable wiring of the six individual measurable quantities, for angular measuring systems with their own bearing: high measurement accuracy along with the reduction of production and assembly tolerances for the mechanical components (lowering of costs), for angular measuring systems without their own bearing: simplified assembly because of reduced requirements made on the running tolerance of the installation parts, increase of thermal stability, since thermally-related eccentricity and run-out errors are compensated.

Parameterization of the circuits can take place, on the one hand, by detecting the factors $k_1$ by calculation (see the example described in what follows). Or the parameter factors $k_1$) are obtained by an identification by means of measuring technology on a system measuring device. Here, the advantage lies in the complete taking into account of graduation errors in the graduated disk, production and assembly errors of the graduated disk seating, as well as uncertainties in the sensor arrangement.

The employment of additional measuring heads (past the six measuring heads represented in FIG. 9) furthermore makes the compensation of higher order eccentricity of axial wobble errors possible, for example, respectively four scanning operations in a 90° arrangement tangentially and axially (a total of eight scanning points).

In what follows, an application of the above described methods in connection with an angle measuring system of the type described by means of FIGS. 9 to 11 with cross grating graduation and six measuring heads.

Assumed are:

radius of the test member 1:r=125 mm, material measure: cross grating graduation on the cylinder surface of the test member, measurement arrangement: six cross grating measuring heads at distances of respectively 60°, i.e. $\psi_1=0°$, $\psi_2=60°$ etc. (see FIG. 9).

In this case, the following results for the Jacobi matrix $$\underline{J} = \begin{bmatrix} 0 & 1 & 0 & 0 & 0 & 125 \\ 0 & 0 & 1 & 108.2532 & -62.5 & 0 \\ -0.866 & -0.5 & 0 & 54.1266\alpha + 93.75\beta & -54.1266\beta - 93.75\alpha & 125 \\ 0 & 0 & 1 & 0 & 125 & 0 \\ 0.866 & -0.5 & 0 & -54.1266\alpha + 93.75\beta & 54.1266\beta - 93.75\alpha & 125 \\ 0 & 0 & 1 & -108.2532 & -62.5 & 0 \end{bmatrix}$$

If the Jacobi matrix is inverted, and the equation (3) is resolved with respect to the unknown $\epsilon = (e_1, e_2, e_3, \alpha, \beta, \delta)^T$, the following is obtained for delta:

$$\gamma = 0.267 \cdot 10^{-2} w_1 - 0.169 \cdot 10^{-14} w_2^2 + 0.267 \cdot 10^{-2} w_3 - \ldots +$$
$$0.912 \cdot 10^{-17} w_4^2 + 0.267 \cdot 10^{-2} w_5 + 0.133 \cdot 10^{-14} w_6^2 + \ldots +$$
$$0.799 \cdot 10^{-14} w_2 w_4 - 0.498 \cdot 10^{-14} w_2 w_6 - 0.246 \cdot 10^{-14} w_4 w_6$$

Using the equation (5'), finally the corrected (actual) angle of rotation φ in accordance with equation (7') results from the equation (6').

For an eccentricity of 0.1 mm, the method produces a 1-φ residual error of approximately 2.8·10-8 seconds of arc, and with an additional wobble error of 0.62 mm at the graduation circumference, a dominant 2-φ residual error of approximately 1.2 seconds of arc results.

The invention may be embodied in other forms than those secifically disclosed herein without departing from its spirit or essential charateristics. The described embodiments are to be considered in all respects only as illustrative and not restrictive, and the scope of the invention is commensurate with th appended claims rather than the foregoing description.

What is claimed is:

1. A device for detecting the rotational movement of an element which is rotatably arranged around an axis, the device comprising:
   a material measure that rotates about axis of rotation;
   a first measuring graduation provided on said material measure and which scans along a first direction, which has a component along said axis of rotation;
   a second measuring graduation provided on said material measure, wherein both said first measuring graduation and said second measuring graduation surround said axis of rotation in a ring shape, and which can he scanned along said first direction and a second direction that is linearly independent of said first direction; and
   at least three measuring heads, which are spaced apart from each other along a circumferential direction which surrounds said axis of rotation, are assigned to each of said first measuring graduation and said second measuring graduation for scanning said first measuring graduation and said second measuring graduations.

2. The device in accordance with claim 1, wherein said first measuring graduation and said second measuring graduation are each formed by line graduations.

3. The device in accordance with claim 1, wherein said first measuring graduation and said second measuring graduation are scanned vertically with respect to each other.

4. The device in accordance with claim 2, wherein said line graduations of said first measuring graduation extend vertically with respect to said line graduations of said second measuring graduation.

5. The device in accordance with claim 2, wherein said line graduations of said first measuring graduation extend parallel with said axis of rotation.

6. The device in accordance with claim 2, wherein said line graduations of said first measuring graduation extend perpendicularly with respect to said axis of rotation.

7. The device in accordance with claim 1, wherein said first measuring graduation is scanned in said first direction, and said second measuring graduation is scanned in said second direction.

8. The device in accordance with claim 1, wherein said first measuring graduation and said second measuring graduation are each formed by corresponding incremental measuring graduations.

9. The device in accordance with claim 1, wherein said first measuring graduation and said second measuring graduation are each formed by a corresponding cross grating graduation.

10. The device in accordance with claim 9, wherein each of said cross grating graduations extends on a surface of said material measure along the circumference of said material measure.

11. The device in accordance with claim 1, wherein said first measuring graduation and said second measuring graduation are spatially separated from each other.

12. The device in accordance with claim 11, wherein said first measuring graduation is arranged on a surface of said material measure, and said second measuring graduation is arranged on a circumferential surface of said material measure, which projects outward from said surface of said material measure.

13. The device in accordance with claim 11, wherein six measured values are generated by said three measuring heads, which represent six independent individual deviations from said axis of rotation.

14. The device in accordance with claim 1, wherein a resulting measuring direction of said first direction and said second direction at each measuring point measured by said at least three measuring heads is respectively located on a straight line, which is oriented skewed with respect to said axis of rotation.

15. The device in accordance with claim 1, further comprising a reference track provided at said material measure.

16. The device in accordance with claim 1, wherein said material measure comprises a cylindrical surface.

17. The device in accordance with claim 1, wherein each of sand three measuring heads is embodied as a cross grating measuring head.

18. The device in accordance with claim 1, comprising three additional measuring heads for scanning said first measuring graduation and said second measuring graduation, wherein said three measuring heads scan said first measuring graduation and said three additional measuring heads scan said second measuring graduation.

19. The device in accordance with claim 18, wherein said three measuring heads and said additional three measuring heads are arranged alternatingly behind each other.

20. The device in accordance with claim 1, wherein said material measure is arranged coaxially about an element that rotates about said axis of rotation; and
   said three measuring heads are wired in such a way with respect to each other that an angle of rotation of said element is determined from measured values generated by said three measuring heads.

21. The device in accordance with claim 18, wherein said material measure is arranged coaxially about an element that rotates about said axis of rotation; and
   said three measuring heads and said three additional measuring heads are wired in such a way with respect to each other that first measurable quantities from said three measuring heads provided for scanning said first measuring graduation are linked together for forming second order terms in said first measurable quantities, and that second measurable quantities from said three additional measuring heads provided for scanning said second measuring graduation are linearly entered related with an angle of rotation of said clement which has to be determined.

22. The device in accordance with claim 21, wherein said first measurable quantities are linked together for forming second order terms in said first measurable quantities, and that said second measurable quantities are linearly entered into the determination of said angle of rotation of said element.

23. The device in accordance with claim 1, further comprising an additional measuring head for generating a redundant output signal.

24. The device in accordance with claim 1, wherein each of said three are arranged at constant angular distances behind each other.

25. The device in accordance with claim 1, wherein said three measuring heads are arranged on a common support.

26. The device in accordance with claim 25, wherein thermal expansion behavior of said common support is essentially identical with thermal expansion behavior of a support of said first measuring graduation and said second measuring graduation.

27. A method for detecting rotational movement of an element which rotates around axis of rotation, the method comprising:
   arranging a first measuring graduation that surrounds an axis of rotation around which an element rotates;
   arranging a second measuring graduation at surrounds said axis of rotation;
   scanning said first measuring graduation along a first direction having a component along said axis of rotation, wherein said scanning said first measuring graduation takes place in at least three locations, which are spaced apart from each other in a circumferential direction surrounding said axis of rotation, and
   scanning said second measuring graduating along a second direction that is linearly independent of said first direction, wherein said scanning said second measuring graduation takes place in at least three locations, which are spaced apart from each other in said circumferential direction surrounding said axis of rotation.

28. The method in accordance with claim 27, further comprising determining individual deviations of said element.

29. The method in accordance with claim 27, further comprising compensating individual deviations of said element.

30. The method in accordance with claim 27, wherein said first direction extends perpendicularly with respect to said second direction.

31. The method in accordance with claim 30, wherein said scanning said first measuring graduation is performed along a direction parallel with said axis of rotation, and said scanning said second measuring graduation in performed in a tangential direction with respect to said axis of rotation.

32. The method in accordance with claim 27, wherein said first measuring graduation and said second measuring graduation each comprise an incremental measuring graduation.

33. The method in accordance with claim 27, wherein said scanning said first measuring graduation and said scanning said second measuring graduation results in the generation of six output signals as measurable quantities that represent six independent individual deviations of said axis of rotation.

34. The method in accordance with claim 27, wherein a resulting measuring direction of said first measuring direction and said second measuring direction at each of said at least three locations is respectively located on a straight line, which is oriented skewed with respect to said axis of rotation.

35. The method in accordance with claim 27, wherein said scanning said first measuring graduation comprises moving a measuring head relative to said first measuring graduation by at least one revolution.

* * * * *

UNITED STATES PATENT AND TRADEMARK OFFICE
CERTIFICATE OF CORRECTION

| | | |
|---|---|---|
| PATENT NO. | : 6,964,102 B2 | |
| APPLICATION NO. | : 10/381076 | |
| DATED | : November 15, 2005 | |
| INVENTOR(S) | : Wilhelm Schröder | |

It is certified that error appears in the above-identified patent and that said Letters Patent is hereby corrected as shown below:

On the Title Page

In Column 1, item (73), delete "Traunrueti" and substitute --Traunreut-- in its place.

In the Claims

Column 17, in claim 1, line 11, after "and which can" delete "he" and substitute --be-- in its place.

Column 18, in claim 13, line 1, after "accordance with claim" delete "11" and substitute --1-- in its place.

Column 18, in claim 17, line 2, before "three measuring heads" delete "sand" and substitute --said-- in its place.

Column 18, in claim 21, line 13, after "rotation of said" delete "clement" and substitute --element-- in its place.

Column 19, in claim 27, line 6, after "measuring graduation" delete "at" and substitute --that-- in its place.

Column 19, in claim 27, line 13, immediately after "axis of rotation" delete "," (comma) and substitute --;-- (semicolon) in its place.

Column 19, in claim 27, line 14, after "second measuring" delete "graduating" and substitute --graduation-- in its place.

UNITED STATES PATENT AND TRADEMARK OFFICE
CERTIFICATE OF CORRECTION

PATENT NO. : 6,964,102 B2
APPLICATION NO. : 10/381076
DATED : November 15, 2005
INVENTOR(S) : Wilhelm Schröder It is certified that error appears in the above-identified patent and that said Letters Patent is hereby corrected as shown below:

In the Claims (cont'd)
     Column 20, in claim 31, line 4, after "measuring graduation" delete "in" and substitute --is-- in its place.

Signed and Sealed this

Third Day of April, 2007

JON W. DUDAS
*Director of the United States Patent and Trademark Office*